METHODS AND SYSTEMS FOR PROVIDING GRAPHICAL DISPLAYS

Filed Aug. 8, 1966 Sheet 1 of 5

INVENTORS.
FRANKLYN L. WILEY
LEROY E. AMENDT
BY
FOWLER, KNOBBE
& GAMBRELL
ATTORNEYS.

METHODS AND SYSTEMS FOR PROVIDING GRAPHICAL DISPLAYS
Filed Aug. 8, 1966 
DIGIT POSITIONS
| STOP | STOP | 8 | 7 | 6 | 5 | 4 | 3 | 2 | 1 | START | |
|---|---|---|---|---|---|---|---|---|---|---|---|
| 0 | 0 | 0 | 0 | 0 | 0 | 0 | 0 | 0 | 0 | 0 | NON-OPERATE |
| 0 | 0 | 0 | 1 | 1 | 1 | 1 | 1 | 1 | 1 | 1 | STOP PLOTTER |
| 0 | 0 | 0 | 1 | 0 | 1 | 1 | 1 | 1 | 1 | 1 | SELECT PLOTTER #1 |
| 0 | 0 | 1 | 0 | 0 | 1 | 1 | 1 | 1 | 1 | 1 | SELECT PLOTTER #2 |
| 0 | 0 | 1 | 0 | 1 | 1 | 1 | 1 | 1 | 1 | 1 | SELECT PLOTTER #3 |
| 0 | 0 | 1 | 1 | 0 | 1 | 1 | 1 | 1 | 1 | 1 | DOUBLE HALF-STEP PLOT |
| 0 | 0 | 1 | 1 | 1 | 1 | 1 | 1 | 1 | 1 | 1 | SINGLE HALF-STEP PLOT |
| 0 | 0 | 0 | 0 | 0 | 1 | 1 | 1 | 1 | 1 | 1 | PEN UP |
| 0 | 0 | 0 | 0 | 1 | 1 | 1 | 1 | 1 | 1 | 1 | PEN DOWN |
| 0 | 0 | 0 | 0 | 0 | NO. OF STEPS | | | | | 1 | +Y |
| 0 | 0 | 0 | 0 | 1 | BETWEEN 1 & 30 | | | | | 1 | +Y, +X |
| 0 | 0 | 0 | 1 | 0 | | | | | | 1 | +X |
| 0 | 0 | 0 | 1 | 1 | | | | | | 1 | -Y, +X |
| 0 | 0 | 1 | 0 | 0 | | | | | | 1 | -Y |
| 0 | 0 | 1 | 0 | 1 | | | | | | 1 | -Y, -X |
| 0 | 0 | 1 | 1 | 0 | | | | | | 1 | -X |
| 0 | 0 | 1 | 1 | 1 | | | | | | 1 | +Y, -X |
FIG. 2.
FIG. 3.
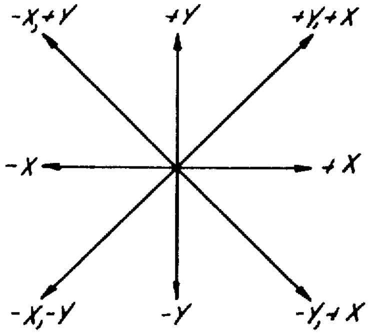
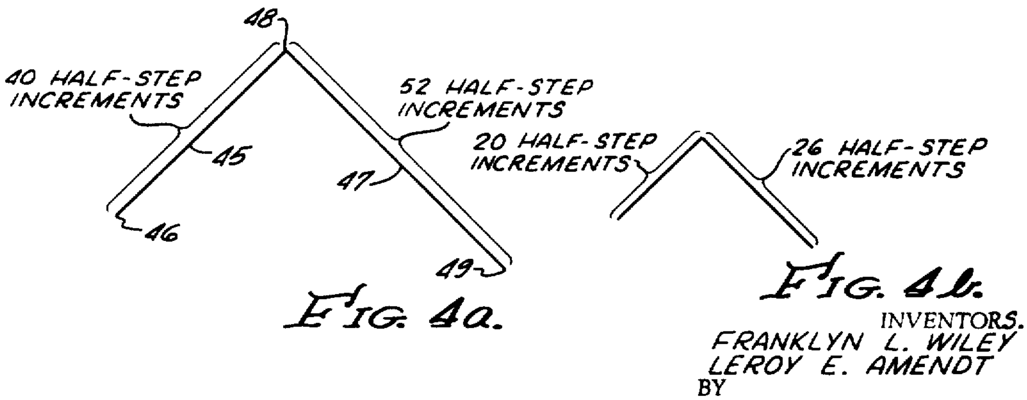
FIG. 4a. FIG. 4b.
INVENTORS.
FRANKLYN L. WILEY
LEROY E. AMENDT
BY
FOWLER, KNOBBE & GAMBRELL
ATTORNEYS.

INVENTORS.
FRANKLYN L. WILEY
LEROY E. AMENDT
BY
FOWLER, KNOBBE
& GAMBRELL
ATTORNEYS.

INVENTORS.
FRANKLYN L. WILEY
LEROY E. AMENDT
BY
FOWLER, KNOBBE
& GAMBRELL
ATTORNEYS.

INVENTORS.
FRANKLYN L. WILEY
LEROY E. AMENDT
BY
FOWLER, KNOBBE
& GAMBRELL
ATTORNEYS.

United States Patent Office 3,434,113
Patented Mar. 18, 1969

3,434,113

METHODS AND SYSTEMS FOR PROVIDING GRAPHICAL DISPLAYS

Franklyn L. Wiley, Long Beach, and Le Roy E. Amendt, Whittier, Calif., assignors to California Computer Products, Inc., Anaheim, Calif., a corporation of California Filed Aug. 8, 1966, Ser. No. 570,914
U.S. Cl. 340—172.5 27 Claims
Int. Cl. G11b *13/00*

ABSTRACT OF THE DISCLOSURE

A graphical data display system for efficiently operating a high speed incremental plotter from a substantially lower speed transmission medium.

The present invention relates to methods and systems for providing graphical displays and particularly to methods and systems for increasing the efficiency of operation of the display means per bandwidth of transmitted data. Although of general utility, this invention is especially adapted for sending substantial quantities of graphical display information in a compacted data format over a low speed data transmission medium.

Incremental plotters for graphically displaying digital computer processed data are well known in the art as exemplified by the Graphical Data Recorder System by A. K. Jennings et al. disclosed and claimed in U.S. Patent No. 3,199,111 and assigned to California Computer Products, Inc., assignee of the present invention. With the advent of large digital computer systems having one or a plurality of remote stations, both the input data and output data are transmitted over substantial distances. Representative transmission media are low speed, i.e., they have a relatively narrow bandwidth—a teletype line transmitting 10 characters per second being representative. With such low speed data transmission rates, one incremental plotter movement per transmitted character provides a very inefficient system for utilizing the graphical display means since contemporary incremental plotters are capable of plotting in excess of 200 increments per second. For example, the Model 665 Digital Incremental Plotter manufactured by California Computers Products, Inc. has a maximum incremental plotting speed of 450 full-step increments per second.

A significant advantage of this invention is that it provides methods and systems for using these low speed data transmission media while providing a substantial increase in the overall plotting speed. In fact, for many forms of data plotting and for the blank intervals when the recording pen is disassociated from the recording medium, the plotter is operated at its maximum recording rate. As a result, the overall efficiency of the plotter per bandwidth of transmitted data is greatly increased.

A correlative advantage provided by the graphical display methods and systems of this invention is a reduced computational load for the data processor. This feature is especially advantageous in time-share computer systems. In such systems, each of several users simultaneously transmits independent data and receives independent computed data from the digital computer on a time-share basis. If high speed links are used to couple the computer to several graphical plotters, the computational effort to transmit high speed data to the several plotters is very extensive, leading to overload conditions in the system. Contrariwise, in the present system, the data processor can accumulate a number of bits in a given direction before generating an output signal, thereby reducing its computational load.

Another feature of the present invention is that the methods and systems thereof facilitate transmittal of a plurality of single function plotter control signals. Such signals may be used for a number of control functions such as stopping all plotters inthe line, selecting one or more plotters from a plurality of plotters and selecting a predetermined plotting mode. One specific example will further illustrate the advantages inherent in this feature. A data gathering center such as the U.S. Weather Bureau processes input data and computes the data necessary for producing the desired graphical display, e.g. a weather map, at a central location and simultaneously transmits this produced data to remote locations equipped with an incremental plotter for precisely reproducing the same weather map. Since certain of the weather maps may not be applicable to one or more of the locations, the single function control enables only selected ones of the remote plotters to be turned on to receive a given map.

Briefly, in accordance with a preferred form of the present invention, a system for providing graphical displays comprises a data processor supplying a succession of output data characters each having a plurality of binary-valued digits. Those characters containing data plot information include a predetermined number of first digits encoding in binary code the number of increments of movement, and a plurality of second digits encoding in binary code the direction of movement. Other characters include a predetermined digit format for encoding a single function plotter control, certain digits of which specify a certain instruction for stopping all plotters on the line, selecting one or more plotters, associating or disassociating the plotter pen for the recording media or selecting a particular plotting mode. The characters are transmitted over a transmission media to the graphical data recorder station where the character is entered into a serial register and detected as to the character type, i.e. single function plotter control or incremental recording plotter control. If single function, the encoded plotter control function is performed by the system and the serial register emptied so as to be ready to receive the next character. If incremental recording, the character is transferred from the input serial register to a parallel register. The latter register is then counted down in sync with a high speed clock and a corresponding recorder control signal produced by each countdown until the register is cleared to zero. Simultaneously, the direction encoded in the character is decoded to direct the control pulses to the appropriate +X, —X, +Y and —Y stepping motors of the graphical plotter, A more thorough understanding of the present invention may be obtained from the following detailed description taken in connection with the accompanying drawings in which:

FIG. 2 is a graphical representation of the character code format useful in connection with the system depicted in FIG. 1;

FIG. 3 is a diagram showing the eight different plotting directions encoded in the format of FIG. 2;

Figure 1:
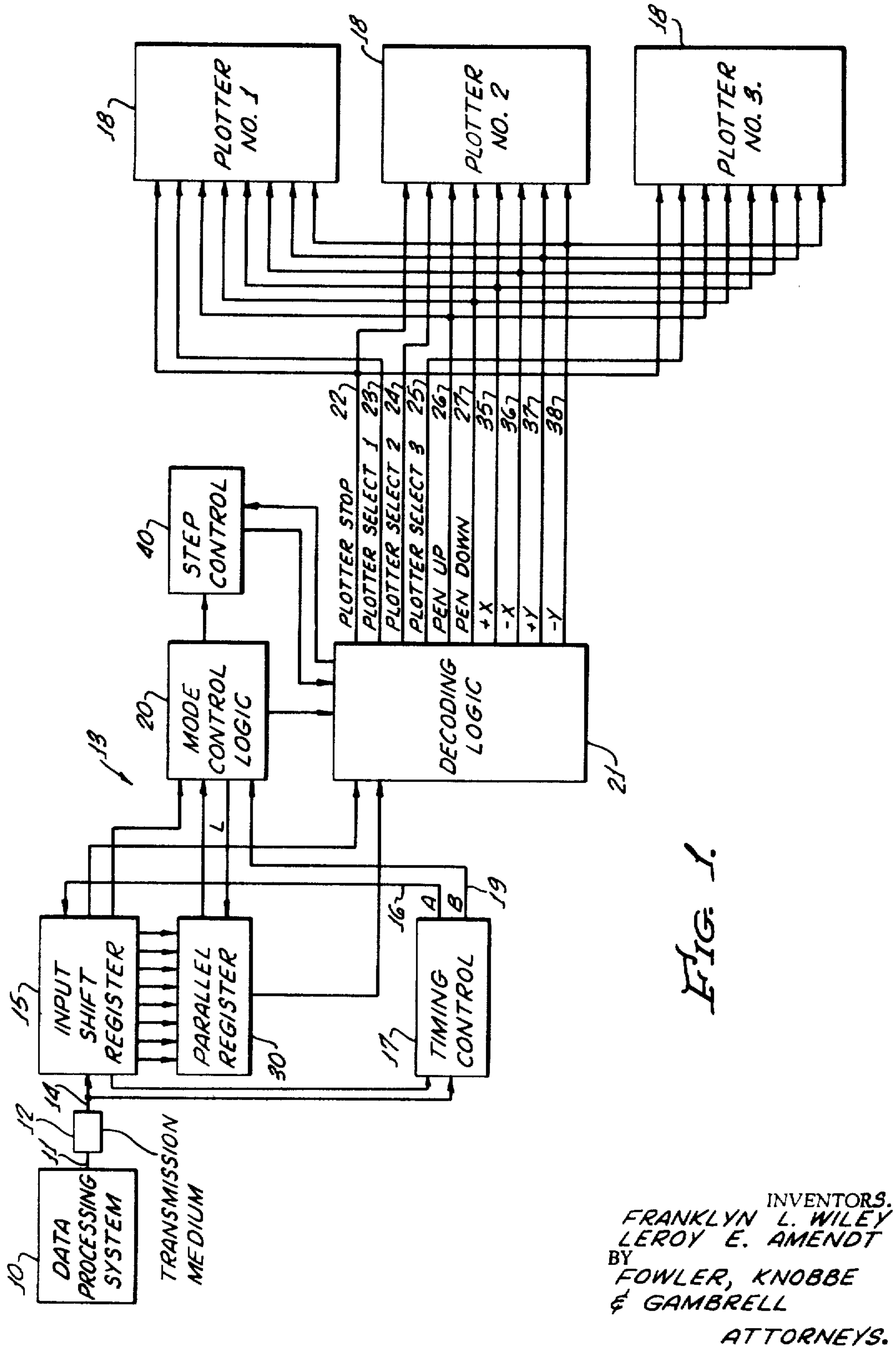
FIG. 1 is a block diagram of an overall system constructed in accordance with this invention for providing graphical displays.
Figure 5A:
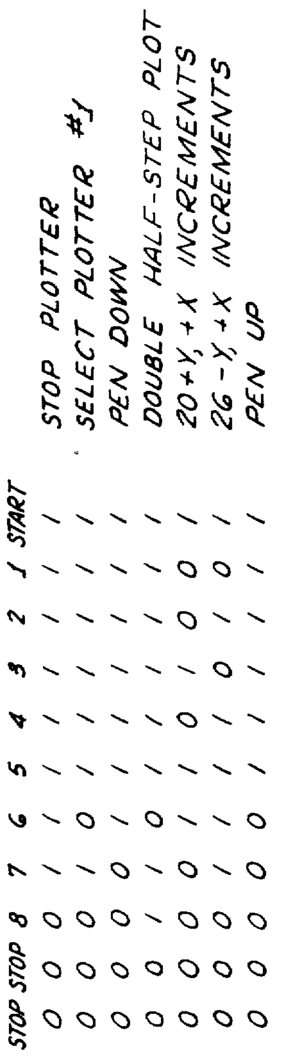
Figure 5B:
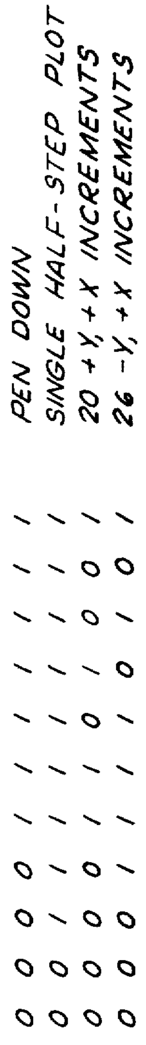
Figure 6:
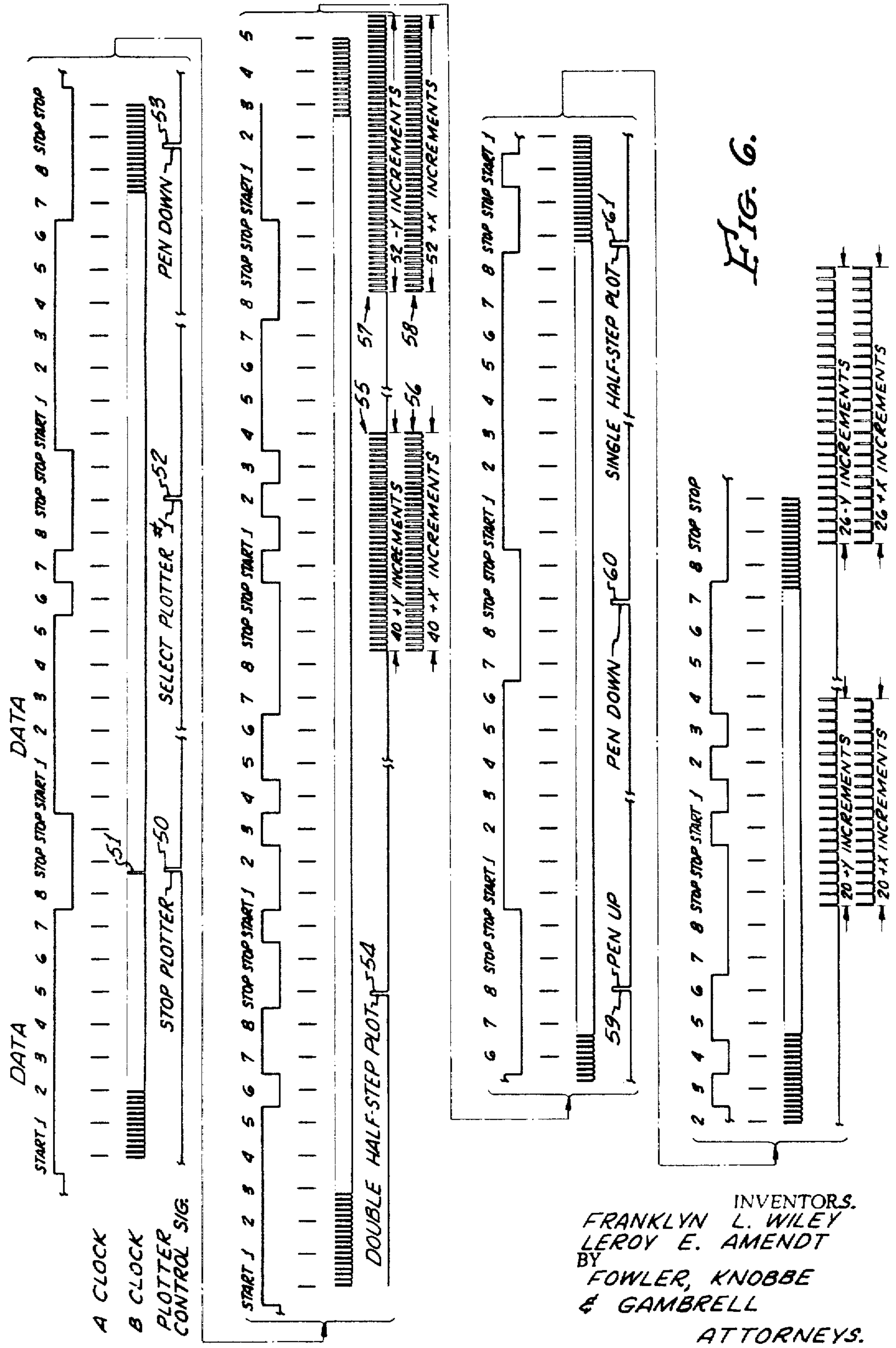
Figure 7:
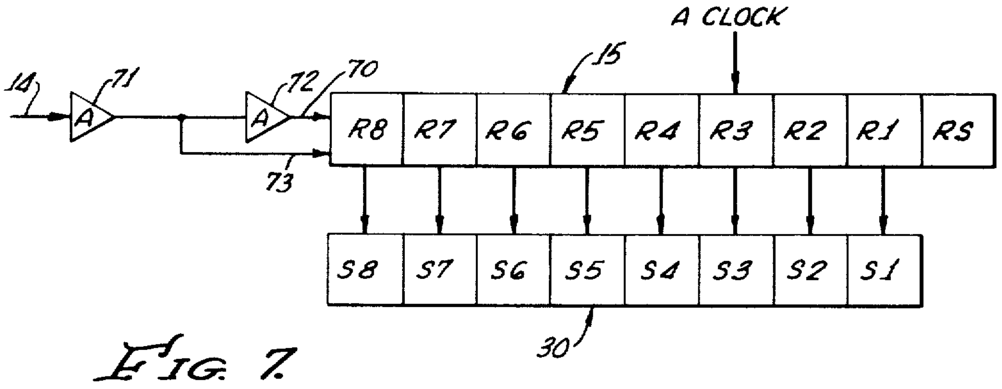
Figure 8:
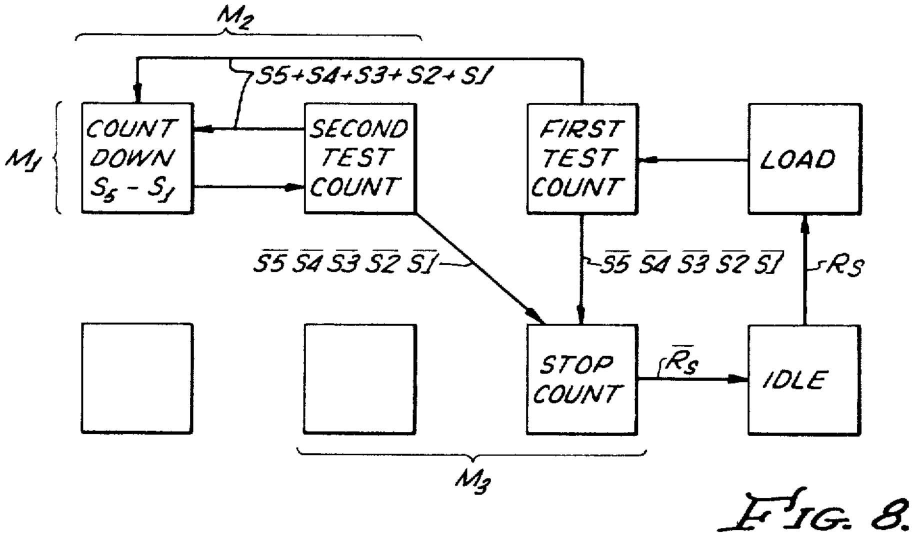
Figure 9:
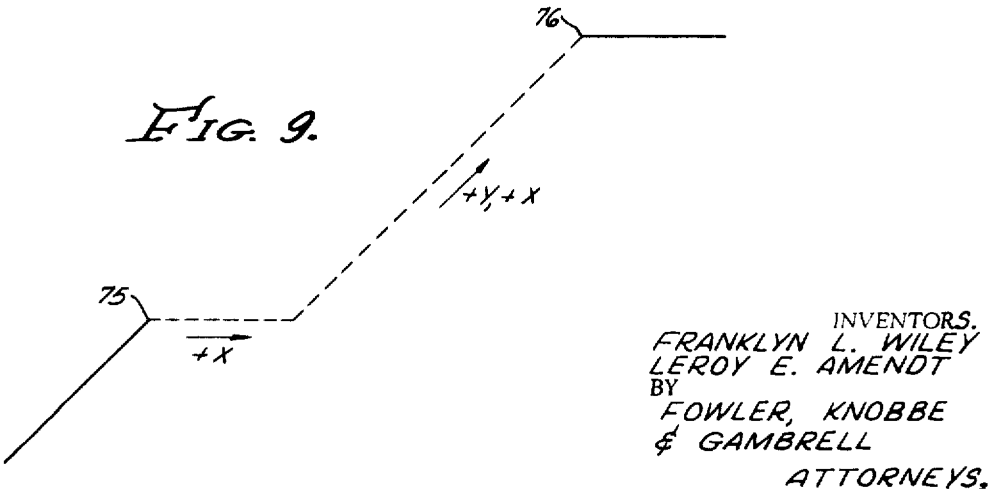

FIGS. 4*a* and 4*b* illustrate simple graphical plots respectively obtained in the double half-step and single half-step plotting modes;

FIGS. 5*a* and 5*b* are graphical representations of the characters encoding the information for performing the graphical plots of FIGS. 4*a* and 4*b*, respectively;

FIG. 6 illustrates graphically the transmitted data signal, the A and B clock pulses and the resulting plotter control signals produced by the system of FIG. 1 in performing the graphical plots of FIGS. 4*a* and 4*b*;

FIG. 7 is a more detailed illustration of the input shift register and the parallel register of FIG. 1;

FIG. 8 is a Veitch diagram representing the arrangement of the states of the principal elements of the mode control logic of FIG. 1; and, FIG. 9 is a graphical illustration of the enhanced data transmission afforded by this invention when the recording pen is disassociated from the recording medium.

GENERAL DESCRIPTION OF GRAPHICAL DISPLAY METHOD AND SYSTEM

Referring to FIG. 1, the overall system comprises a data processing system 10 typically a digital computer which supplies an output serial wave train at 11 for transmitting processed output data characters over a transmission medium 12 to the graphical data recorder system 13. Typically, the character transmission rate of the transmission medium 12 is substantially less than the incremental plotting rate capacity of the graphical data plotter. By way of specific example, a teletype line has the capacity of transmitting ten 11-digit characters per second whereas the Model 665 Digital Incremental Plotter manufactured by California Computer Products, Inc., has a plotting capacity of 450 .010" full-step increments per second, or 900 .005" halp-step increments per second. It will be apparent that nowhere near the maximum plotting capacity of the recorder will be utilized if one character is required for each recording increment—the plotting rate being excessively slow and inefficient if the graphical data is plotted at the incremental rate of one increment per character.

The preferred embodiment of the invention described herein utilizes the American Standard Code for Information Interchange which comprises one start pulse, eight data code pulses, and two or more stop pulses for a character at least eleven bits long. With the present invention, each such character has the capability of encoding a plurality of incremental plotting movements. Such a code form is shown in FIG. 2 wherein each character includes a Start digit, eight data digits respectively numbered 1 through 8 and two Stop digits. The eight data digit positions may be considered to be sub-divided into digits 1 through 5 and digits 6 through 8. A single function plotter control is encoded when each of the digits 1 through 5 are true or binary 1 state. The remaining data digits 6 through 8 are binary encoded to specify the instruction for any one of the following plotter control functions—for stopping any of the plotters then in operation (Stop Plotter), selecting a plotter included in the system (Select Plotter No. 1, Select Plotter No. 2 and Select Plotter No. 3), selecting either the double half-step or single half-step plotting modes (Double Half-Step Plot and Single Half-Step Plot), or associating or disassociating the plotter with the recording media (Pen Up or Pen Down). By way of example, the Stop Plotter instruction is encoded with a "1" in the digit 6 position, a binary 1 in the digit 7 position and a binary 0 in the digit 8 position. Each of these instructions will be more fully described as the description ensues.

Following the single function plotter control characters in FIG. 2 are the series of characters for encoding the direction of movement and the magnitude of movement in the predetermined direction. As shown, the digit positions 6, 7 and 8 have been selected to encode eight unique directional instructions, a series of binary 0's encoding +Y, a binary 1 in the digit 6 position following by binary 0's for the +Y, +X direction and likewise for the +X; −Y, +X; −Y; −Y, −X; −X and +Y, −X direction. The eight encoded directions are illustrated in FIG. 3. Movement in either the +Y or +X directions is obtained by advancing the plotter in solely the +Y or +X direction. Contrariwise, movement along axes displaced at 45° with respect to X and Y axes is achieved by simultaneously moving the plotter an equal incremental step along both the X and Y axes in the appropriate direction.

The number of increments of movement in the encoded direction from 1 to 30 incremental steps is provided by binary encoding the five digit positions 1 through 5. For example, one increment of movement is encoded by a binary 1 in the digit 1 position followed by binary 0's in the 2 through 5 digit positions.

The multi-digit characters are entered, one digit at a time, from the output 14 of the transmission medium 12 into the input shift register 15 of the system 13 under the control of the A clock on lead 16 produced by the timing control 17. The A clock operates at the digit rate of the received data. Advantageously, the A clock is triggered ON from each start pulse and triggered OFF when the input shift register is cleared so that the A clock is resynchronized at the beginning of each character of the serial wave train. The remainder of the plotter control system is synchronously driven by the B clock on output lead 19 of the timing control 17. This clock is advantageously driven at or near the maximum capacity of the plotters 18 and therefore operates at a frequency rate substantially higher than the A clock. By way of specific example, for signals received over teletype, the A clock runs at 110 c.p.s. and, for contemporary graphical plotters, the B clock runs at 600 or more c.p.s.

When the input shift register 15 is filled with a character, the mode control logic 20 is enabled and the digit positions 1 through 5 are detected to determine if the received character encodes a single function plotter control or an incremental recording plotter control. If the former is indicated by a series of binary 1's in the 1 through 5 digit positions, the decoding logic 21 under the control of the mode control logic 20 decodes the instruction encoded in the digit positions 6, 7 and 8 and applies the appropriate control signal on output leads 22–27 respectively designated as the Plotter Stop, Plotter Select 1, Plotter Select 2, Plotter Select 3, Pen Up, and Pen Down. As shown, the Plotter Stop control lead 22 is connected to each of the plotters 18 included in the system so that all of the plotters in the system are interrupted by this signal. The Plotter Select 1, 2 and 3, leads 23, 24, 25 are respectively connected only to their associated plotters so that a signal applied on one of these leads will actuate only the designated plotter. The Pen Up and Pen Down leads 26, 27 are connected to all of the plotters such that any previously selected plotter 18 will be controlled according to the control signal transmitted to either associate or disassociate the plotting means with the recording medium.

When an incremental recording plotter control is encoded by the character temporarily stored in the input shift register, the mode control logic 20 enables the parallel register 30 which is then loaded with the same character data digits as are then stored in the input shift register. The input shift register returns to zero at the next occurring A clock pulse to be ready for entry of the next character received at the output of the transmission means 12. When the shift register 15 clears, the A clock is triggered OFF until receipt of the next start pulse in lead 14.

Following loading of the parallel register 30, the mode control logic 20 counts down the value stored in the digit positions 1 through 5 of the parallel register one binary digit at a time until a count of zero is registered—all digit positions 1 through 5 register binary 0's. This countdown is performed at the rate of one digit countdown for every other one of the B clock pulses until all five digit positions are cleared to 0. Simultaneously with this countdown, the decoding logic detects the directional information encoded in the digit positions 6 through 8 and applies an incremental plotter control signal over a respective one or ones of the +Y, −Y, +X and −X leads 35, 36, 37, 38. A control signal will be applied to only one of these leads for movement in either the ±X or ±Y direction whereas simultaneous control signals will be applied both on an X and a Y lead for movement along a 45° axis. These incremental plotter control signals will energize that one or ones of the plotters which have been previously selected by transmission of a Plotter Select character.

In the system 13, step control 40 is responsive to the mode control logic 20 and is triggered to one or the other of two stable states corresponding to Double Half-Step and Single Half-Step plotting modes. In the double half-step plotting mode, two incremental plotter control impulses are applied to one or more of the leads 35–38 for each recording increment encoded in the digit positions 1 through 5. This means that although the parallel register is being counted down for every two of the B clock pulses, an incremental plotter control impulse is applied to one or more of the leads 35–38 for each of the B clock pulses. In the single half-step plotting mode initiated by the Single Half-Step Plot instruction, the plotting pen is advanced once each time the parallel register is counted down, i.e. an incremental plot is made for every other one of the B clock pulses. The advantages of these alternate plotting modes are described hereinafter.

EXAMPLES FURTHER ILLUSTRATING THE SYSTEM OPERATIONS

The operation of the plotting system of FIG. 1 may be further understood by considering its operation for performing the simple graphical plot of FIG. 4*a* wherein a first line segment 45 twenty full-step increments long is to be drawn along a 45° axis in the +Y, +X direction from a starting point 46 and a connecting line segment 47 twenty-six full-step increments long is to be drawn in the +X, −Y direction from the terminating point 48 of the first line segment.

The information transmitted from the data processing system 10 to the plotter control system 13 for reproducing the plot of FIG. 4*a* is shown in FIG. 5*a*. The first characters transmitted comprise a series of single function plotter control characters for stopping all plotters, selecting the desired plotter or plotters, associating or disassociating the plotter element with the recording medium and selecting either the double or the single half-step plotting mode. In the particular example shown in FIG. 5*a*, the first character transmitted is a Stop Plotter character which turns OFF any plotters which were previously ON. This character is followed by a Select Plotter No. 1 character. Successive single function plotter controls are the Pen Down control character and the Double Half-Step Plot characters. The plotter control system 13 is then ready to receive the incremental plotting information which, for the plot shown, can be transmitted in only two characters. Thus, digits 1 through 5 of the first incremental plotter control character encode twenty increments and digits 6 through 8 the direction +Y, +X. Digits 1 through 5 of the second incremental plotter control character encode twenty-six increments and digits 6 through 8 thereof the direction −Y, +X. Assuming that the plot is to be terminated at point 49, the Pen Up single function plotter control character is transmitted as shown. The double half-step mode produces two half-step increments for each encoded increment, i.e. the first incremental plotter control character causes a total of forty half-step incremental movements of the No. 1 plotter in the +Y and +X directions simultaneously by applying forty impulses to leads 35 and 37 in sync with the B clock.

FIG. 6 illustrates the data characters and resultant control signals produced by the graphical data recorder system for achieving the plot of FIG. 4*a* and also FIG. 4*b* as discussed below. As shown, the data signals received at the output of the transmission means typically comprise a positive voltage level for a binary 1 digit and a negative voltage level for a binary 0 digit. Accordingly, the Stop Plotter signal comprises a positive voltage extending through the start and the first seven data digit intervals followed by negative potential for the eighth data digit and the two stop digits. The A clock is initiated by the start pulse and is preset to occur at the center of each of the transmitted data signals. As described above, the B clock may be asynchronous with respect to the A clock and operates at a substantially higher repetition frequency rate as shown.

Following entry of the first character in the input shift register, the information contained therein is decoded by the plotter control system a Stop Plotter control pulse 50 produced thereby over the control line 22 (FIG. 1) in sync with pulse 51 of the B clock. In a similar manner, the Select Plotter No. 1 control pulse 52, Pen Down control pulse 53 and Double Half-Step Plot control pulse 54 are produced.

The incremental recording control characters are registered in the input shift register in the same manner and following entry of same, a series of corresponding pulses are produced over both the Y and X control leads 35 through 38 in sync with the B clock. Thus, the first incremental recording control character encodes 20 increments in digit positions 1 through 5 and the +Y, +X direction in digit positions 6 through 8. This character, when dedecoded, causes 40 +Y recording control pulses 55 and 40 +X recording control pulses 56 to be transmitted over the respective leads 37 and 35. As shown in FIG. 6, an incremental recording control pulse is produced for each B clock pulse since the step control 40 had previously been triggered to the double half-step mode by pulse 54. In like manner, the second incremental recording control character is decoded to produce 52 recording control pulses 57 over the −Y lead 38 and 52 recording control pulses 58 over the +X lead 35 in sync with the B clock. The data plot is concluded by transmitting the Pen Up single function plotter control character for producing the Pen Up control pulse 59 on lead 26.

The distinction between the double half-step plot and the single half-step plot is further illustrated by the remaining portion of FIG. 6 and FIGS. 4*b* and 5*b*. The incremental recording control characters tabulated in FIG. 5*b* are identical to those in FIG. 5*a*, with the exception that they are preceded by the Single Half-Step Plot control character. The plot is initiated by first transmitting the Pen Down single function plotter control and the Single-Half Step control characters which produce the control pulses 60, 61 respectively. The first incremental recording control character causes a recording control pulse to be produced by every other B clock pulse resulting in only half as many increments in the Y and X directions for the first character to produce the plot shown in FIG. 4*b*.

DOUBLE AND SINGLE HALF-STEP RECORDING MODES

The half-step recording mode referred to herein refers to the capability of a reduced plotting step size. While such a capability may be provided by utilizing a stepping motor arrangement in which each step motor has an associated gear train for reducing the size of the plotting step increment, this mode is preferably obtained in accordance with the co-pending application of James E. Newland et al. entitled "Display System and Methods," Ser. No. 406,364, filed Oct. 26, 1964 and assigned to California Computer Products, Inc. This application describes and claims means for providing a half-step size by electronic control and without appreciable change in the design of existing stepping motors.

One advantage of the half-step mode is that it enables a greater definition plot to be made from a given incremental plotter. Thus, in the normal full-step plotting mode, each line segment is made up of a series of .01″ segment whereas in the half-step mode, the graphical display is provided by a series of .005″ segments. Another advantage of the half-step mode is that it has been found that the stepping motors and their associated mechanisms operate more smoothly and in an improved manner when the stepping motors are advanced a half-step at a time. Accordingly, the preferred embodiment described herein transmits all the information in half-step format. However, it will be apparent that the systems and methods of this invention are applicable for use in conjunction with incremental graphical plotters in general and are not in any way restricted to the half-step plotting mode.

In the Single Half-Step mode, one recording pulse is produced for each increment encoded in the transmitted data character and in the Double Half-Step mode, two recording control pulses are produced for each encoded value. Each recording control pulse is transmitted to the incremental recorder 18 from the decoding logic 21 over one X or one Y or one each of the X, Y control leads 35–38. The incremental plotters 18 are preferably constructed such that each received recording control pulse provides a half-step movement of the associated stepping motor in the manner of the co-pending application Ser. No. 406,364 so as to produce a .005" incremental movement of the recording pen relative to the recording medium.

A MORE DETAILED DESCRIPTION OF THE SYSTEM

*Data Processing System 10*

In accordance with conventional practice, the data processing system 10 utilizes the end coordinates of a line segment for generating the requisite plurality of individual plotter steps along the eight arbitrary fixed axes of FIG. 3 for approximating the line segment. The particular code for the desired direction in the digit positions 6, 7 and 8 is determined by the data processing system by the table lookup technique. The data processing system advantageously accumulates the bits corresponding to plural increments of plotter movement in a given direction and performs only one table lookup for this group of bits, whereas in fast serial transmission, a table lookup must be performed for each bit since each increment code must be transmitted as it is produced. Accordingly, the present invention by reducing the number of codes required to perform a given amount of graphical plotting, reduces the overall computational load of the data processing system. As noted above, this feature is of special utility in time-share computer systems.

*Input Shift Register 15 and Parallel Register 30*

A more detailed block diagram of the input shift register 15 and the parallel register 30 is shown in FIG. 7. As shown, each of the registers comprises a plurality of storage elements (flip-flop stages being those which are most commonly used), the stages being respectively labeled R8, R7, R6, R5, R4, R3, R2, R1 and RS for the input shift register and S8, S7, S6, S5, S4, S3, S2, S1 for the parallel register. The input data characters may be considered to have a + polarity for binary 1 encoding and a − polarity for binary 0 encoding as shown in FIG. 5. The flip-flop stages are assumed to be triggered only by positive voltages. Accordingly, the binary 1 input 70 of the R8 flip-flop is connected to the output 14 of the transmission medium via a pair of inverting stages 71 and 72 so that the positive valued signals are inverted twice and are applied as positive signals to this input. The negative valued signals are inverted by the first inverter stage 71 and applied to the binary 0 input 73 of the R8 flip-flop as positive potential signals. In this manner, the R8 flip-flop is triggered to the binary 1 state by positive data signals and to the binary 0 state by negative data signals. The input shift register is controlled by the A clock to receive one digit at a time in sequence with the input serial wave train. Since the least significant data digit immediately follows the start pulse, the data is shifted into this register from the least to the most significant data digits. When the start pulse gets to the end of the shift register and triggers the RS flip-flop to its binary 1 state, the mode control logic is responsive to the RS flip-flop and initiates the succeeding operational steps including loading the parallel register 30 and clearing to 0 the input shift register as described below. The eighth data digit appears at the output of the inverter stage 72 when the RS flip-flop is triggered to its true or binary 1 state by the sequential advancement of the start pulse through the R7 through R1 stages.

The logic equations defining the inputs of each of the RS–R7 flip-flops of the shift register 15 are as follows:

$$1RS=R1A \quad (1)$$
$$0RS=(\overline{R1}+RS)A \quad (2)$$
$$1R1=R2\overline{RS}A \quad (3)$$
$$0R1=(\overline{R2}+RS)A \quad (4)$$
$$1R2=R3\overline{RS}A \quad (5)$$
$$0R2=(\overline{R3}+RS)A \quad (6)$$
$$1R3=R4\overline{RS}A \quad (7)$$
$$0R3=(\overline{R4}+RS)A \quad (8)$$
$$1R4=R5\overline{RS}A \quad (9)$$
$$0R4=(\overline{R5}+RS)A \quad (10)$$
$$1R5=R6\overline{RS}A \quad (11)$$
$$0R5=(\overline{R6}+RS)A \quad (12)$$
$$1R6=R7\overline{RS}A \quad (13)$$
$$0R6=(\overline{R7}+RS)A \quad (14)$$
$$1R7=R8\overline{RS}A \quad (15)$$
$$0R7=(\overline{R8}+RS)A \quad (16)$$

These equations assume that "JK" flip-flops are used, that is, flip-flops with an internal gate so that if input signals are applied to both the 1 and 0 flip-flop inputs, this anomaly is resolved by the flip-flop changing to a state opposite to its preceding state.

It will be noted that by examining the logic Equations 1 through 6 that each flip-flop is triggered to the state of the immediately preceding flip-flop coincident with an A clock pulse. In this manner, the data is moved down the shift register one data digit at a time until the RS flip-flop is triggered. Following triggering of the RS flip-flop to the binary 1 state, the next succeeding A clock pulse causes each of the flip-flops RS through R8 to trigger to the binary 0 state as defined by the second term of each of the binary 0 input Equations 2, 4, 6, 8, 10, 12, 14 and 16. In this way, the register is clear to 0 following the filling of the RS flip-flop. It will be further noted that the binary 1 input equations of all data flip-flops R1 through R7 contain an $\overline{\text{RS}}$ term which means that the RS flip-flop inhibits all shifting of the data once it is triggered to its true or binary 1 state. In this way, the input shift register knows that it has been filled with the data digits associated with one character.

The parallel register 30 comprises a plurality of flip-flop stages S1 through S8 respectively coupled to the shift register stages R1 through R8 and the output of the inverter stage 72 so that when the input shift register is filled with the data digits, the parallel register may be parallel loaded with the same character stored in the input shift register.

The logic equations defining the inputs of each of the S1 through S8 flip-flops of the parallel register 30 are as follows:

$$1S8=LR8B \quad (17)$$
$$0S8=L\overline{R8}B \quad (18)$$
$$1S7=LR7B \quad (19)$$
$$0S7=L\overline{R7}B \quad (20)$$
$$1S6=LR6B \quad (21)$$
$$0S6=L\overline{R6}B \quad (22)$$
$$1S5=(LR5+CN\overline{S3}\overline{S2}\overline{S1}\overline{S4})B \quad (23)$$
$$0S5=(L\overline{R5}+CN\overline{S3}\overline{S2}\overline{S1}\overline{S4})B \quad (24)$$
$$1S4=(LR4+CN[\overline{S3S2S1}])B \quad (25)$$
$$0S4=(L\overline{R4}+CN[\overline{S3S2S1}])B \quad (26)$$
$$1S3=(LR3+CN\overline{S1S2})B \quad (27)$$
$$0S3=(L\overline{R3}+CN\overline{S1S2})B \quad (28)$$
$$1S2=(LR2+CN[\overline{S1}])B \quad (29)$$
$$0S2=(L\overline{R2}+CN[\overline{S1}]) \quad (30)$$
$$1S1=(L\overline{R1}+CN)B \quad (31)$$
$$0S1=(L\overline{R1}+CN)B \quad (32)$$

Equations 17–22 and the first terms of each of the Equations 23–32 denote that each of the S1–S8 flip-flops are triggered to correspond with the binary values temporarily stored in the input shift register coincident with the term LB where L is provided by the mode control logic 20 and B is the clock function on lead 19. Both the L term and the second term of each of the Equations 23–32 will be described in more detail below.

*Mode Control Logic*

The mode control logic comprises three flip-flops M1, M2 and M3 and associated logic for providing a plurality of different operating modes. The structure and operation of the mode control logic are most clearly explained by the Veitch diagram of FIG. 8 and the logic equations below.

Each block of the Veitch diagram represents a unique system step or stage indicated by the controlling flip-flops. The blocks are so designated and arranged so as to permit the operating status of each of the flip-flops to be identified directly from the diagram. The marginal brackets indicate the relationships between the "true" or "1" status of each flip-flop and the different operating states of the system. Proceeding along a vertical column or a horizontal row within a given bracket, the associated flip-flop is in a "1" or "true" condition for all operating states within that horizontal row or column. For example, flip-flop M1 is in the "1" status for all conditions represented by the first horizontal row on the diagram. Conversely, M1 is in the "0" status for the system steps represented in the second horizontal row on the diagram. Similarly, M2 is in the "1" status for all steps represented in the first and second columns on the diagram and in the "0" condition for all other steps. This diagram not only permits ready identification of the different system operating states, but enables changes in the status of the different flip-flops to be directly identified with respect to the steps within the system mode. Thus, when the mode control logic is in the "Idle" mode identified by the rectangle position in the fourth column and second row, the chart of FIG. 8 indicates that flip-flops M1, M2 and M3 are all false.

The diagram of FIG. 8 has additional usefulness because it also aids visualization of the prerequisites for changes in the system operating state. The arrows accompanying terms show the switching sequences and the conditions under which the switching occurs. Each switching action occurs coincident with a B clock pulse. An arrow without an accompanying logic term indicates that switching occurs automatically, coincident with the next clock pulse.

The following logic equations describe the structure of the logic interconnecting the M1, M2 and M3 flip-flops.

$$1M1=RS\overline{M3}B \quad (33)$$
$$0M1=(\overline{S5}\overline{S4}\overline{S3}\overline{S2}\overline{S1})M3B \quad (34)$$
$$1M2=(S5+S4+S3+S2+S1)M1M3B \quad (35)$$
$$0M2=(\overline{S5}\overline{S4}\overline{S3}\overline{S2}\overline{S1})M3B \quad (36)$$
$$1M3=M1B \quad (37)$$
$$0M3=\overline{RS}\overline{M1}B+(S5+S4+S3+S2+S1)M1M2B \quad (38)$$

DETAILED OPERATIONAL DESCRIPTION OF THE GRAPHICAL DISPLAY SYSTEM

A detailed description of the system is provided below in conjunction with the Veitch diagram of FIG. 8. Other terms used below may be equated with a particular operating condition as follows:

PS =One or more plotters 18 have been selected selected (39)

CN $=\overline{M3}M2$ (countdown) (40)

C31=R5R4R3R2R1 (The condition designated above as a single function plotter control.) (41)

$\overline{C31}=\overline{R5}+\overline{R4}+\overline{R3}+\overline{R2}+\overline{R1}$ (An incremental recording control signal, i.e. a count other than 31 is stored in the digit positions 1–5 of the input shift register.) (42)

SC =Step control 40 in Double Half-Step Mode (43)

$\overline{SC}$ =Step control 40 in Single Half-Step Mode (44)

*Idle Mode*

In the idle mode, all of the mode control flip-flops M1, M2 and M3 are in their 0 or false state as shown in the Veitch diagram. The system is then in condition for receiving an input data character and filling the input shift register under the control of the A clock.

*Load Mode*

When the input shift register is filled, its RS flip-flop is triggered ON by the start pulse. The next succeeding B clock pulse triggers the M1 flip-flop to its 1 or true state as defined by Equation 33. In the Load mode (L), the parallel register 30 is enabled if a plotter or plotters 18 have been previously selected and if the single function plotter control signal is not present in the character then stored in the input shift register. The interconnections between the mode control logic for parallel loading the parallel register are described in the following equation:

$$L=PSM1\overline{M2}\overline{M3}\overline{C31} \quad (45)$$

Normally, the first characters received are single function control characters in which the C31 term is true (see FIGS. 5*b* and 6). When such characters are present, the parallel register is not loaded and instead the single function plotter control signals are produced by the decoding logic in conjunction with the character stored in the input shift register, according to the following equations:

| | | |
|---|---|---|
| Plotter Stop | $=\overline{R8}R7R6C31M1\overline{M2}\overline{M3}B$ | (46) |
| Select Plotter #1 | $=\overline{R8}R7\overline{R6}C31M1\overline{M2}\overline{M3}B$ | (47) |
| Select Plotter #2 | $=R8\overline{R7}\overline{R6}C31M1\overline{M2}\overline{M3}B$ | (48) |
| Select Plotter #3 | $=R8\overline{R7}R6C31M1\overline{M2}\overline{M3}B$ | (49) |
| 1*SC* | $=R8R7\overline{R6}C31M1\overline{M2}\overline{M3}B$ | (50) |
| 0*SC* | $=R8R7R6C31M1\overline{M2}\overline{M3}B$ | (51) |
| Pen Up | $=\overline{R8}\overline{R7}\overline{R6}C31M1\overline{M2}\overline{M3}B$ | (52) |
| Pen Down | $=\overline{R8}\overline{R7}R6C31M1\overline{M2}\overline{M3}B$ | (53) |

*First Test Count Mode*

This mode is automatically entered following the Load Mode upon occurrence of the next succeeding B clock pulse as defined by Equation 37, this mode state being designated as the first test count state in the Veitch diagram. In this state, the mode control logic 20 responds to the data stored in the parallel register and if a count of 0 is stored in the S1 through S5 flip-flops thereof, it steps to the Stop Count Mode upon the next B clock pulse. The interconnecting logic for performing this function is defined by Equation 34. Since the M1 flip-flop must be triggered from its binary 1 to its binary 0 state to transfer from the First Test Count to the Stop Count modes, it will be seen from this equation that all of the parallel register flip-flops S1 through S5 must be in their respective false or 0 states in order to trigger the M1 flip-flop to its 0 state on the next B clock pulse.

*Stop Count Mode*

The Stop Count Mode is a lockout or wait mode. The system remains in this mode until the next succeeding A clock pulse at which time the RS flip-flop is triggered to its 0 state and the M3 flip-flop is then triggered to its 0 state as designated by the first term of Equation 38. This stop count or interlock mode is provided so as to prevent each succeeding B clock pulse from triggering successive Load and First Test Count modes. Since B clock is substantially faster than the A clock, several such cycles would normally occur between successive A clock pulses.

*Count Down Mode*

The Count Down Mode is achieved when the S1 through S5 flip-flops designate a count other than 0, i.e. the parallel register has been filled with a data plot character during the Load Mode. As shown on the Veitch diagram and defined by Equations 35 and 38, the M2 flip-flop is changed to its true state and the M3 flip-flop is changed to its false state when any of the S registers are filled. Each occurrence of the Count Down Mode results in the parallel register being counted down by one. Thus, if the S5 through S1 flip-flop registers register a binary count of 10100 (decimal value 20) when loaded at the Load Mode, coincidence of the Count Down Mode and a B clock pulse causes the S register to be changed to 10011 (decimal value 19). This operation is achieved by logic associated with the parallel register as defined by the second terms of each of the Equations 23, 24, 25, 26, 27, 28, 29, 30, 31 and 32.

*Second Test Count Mode*

Following the Count Down Mode, the mode control logic automatically enters the Second Test Count Mode upon occurrence of the next B clock pulse as a result of a change of state of the M3 flip-flop from its false to its true state (see Equation 37). In the Second Test Count Mode, the content of flip-flops S5 through S1 of the parallel register determine whether the following mode is another countdown or a transfer to the stop count mode. As shown in the Veitch diagram and defined by logic Equation 38, if these flip-flops of the parallel register have a quantity other than 0, the next B clock pulse returns the M3 flip-flop to its false state and produces another countdown step. If, however, the previous Count Down Mode returned all of the S1 through S5 flip-flops to their false state, the mode control transfers to the Stop Count Mode (as defined by Equation 34) and remains in this mode until the next A clock pulse clears the RS flip-flop and the mode control logic assumes its Idle Mode (the first term of Equation 38).

*Decoding Logic for Data Plot*

The logic and interconnections within the decoding logic for performing data plots in the +X, +Y, −X and −Y directions are defined by the following logical equations:

$$+X=[\overline{S8}S6+\overline{S8}S7][M2SC+M2\overline{M3SC}]PSB \quad (54)$$

$$+Y=[\overline{S8}\overline{S7}+S8S7S6][M2SC+M2\overline{M3SC}]PSB \quad (55)$$

$$-X=[S8S6+S8S7][M2SC+M2\overline{M3SC}]PSB \quad (56)$$

$$-Y=[S8\overline{S7}+\overline{S8}S7S6][M2SC+M2\overline{M3SC}]PSB \quad (57)$$

The term contained within the first bracket of each of the Equations 54–57 defines the appropriate logic for decoding the directional information contained in the S6, S7 and S8 flip-flops of the parallel register 30. The term contained within the second bracket of each of these equations defines the manner in which the incremental recording control pulses are produced in sync with clock B for the Double and Single Half-Step Modes, respectively. When the step control (SC) flip-flop 40 is in its true or binary 1 state, an incremental recording control pulse will be supplied over the appropriate lead or leads 35–38 to the selected plotter or plotters 18 for every B clock pulse so long as the M2 flip-flop remains true. Accordingly, incremental recording control pulses are produced when the mode control logic 20 receives a B clock pulse while in either the Count Down or Second Test Count Modes, i.e. when it transfers from the Count Down to the Second Test Count modes; from the Second Test Count back to the Count Down modes and from the Second Test Count to the Stop Count modes. Contrariwise, if the step control flip-flop is in its false or binary 0 state, an incremental recording control pulse is produced only when flip-flop M2 is true and flip-flop M3 is false, i.e. only upon transfer from the Count Down Mode to the Second Test Count Mode and no pulse produced when the mode control logic 20 transfers to the Count Down or Stop Count modes. As a result, incremental recording control pulses are produced only for every other B clock pulse as illustrated in FIG. 6. In similar manner, the incremental recording control pulses are produced on the +X, −X, +Y and/or −Y leads 35–38 in accordance with the directional information encoded in the digit positions 6–8 of the parallel register 30.

It will thus be seen that the graphical data recording systems and methods described hereinabove provide a very efficient form of data transfer between the data processing system and the plotter. Although typical data includes line segments at other than multiples of a specific angle (45° in the embodiment described herein) which require short line segments—a few or even a single increment in a given direction—for most accurate approximation, the overall data plotting generally includes a number of extended line segments along the selectible angles so that the overall data plot can be performed much faster than one increment per character, i.e. 10 or more increments per character is a typical average plotting rate attainable.

Another feature of the invention which further enhances its plotting speed is that the recording pen may be very swiftly translated when disassociated from the recording medium. By way of example, referring to FIG. 9, a plot is shown in which the pen is disassociated from the recording medium at point 75 and translated to point 76. As shown, this translation movement is accomplished by moving the pen along two segments 45° apart, namely, the +X and +Y, +X directions. Translation along these respective axes can be accomplished at the full speed of the incremental plotter. This means that with even very intricate plots which permit only a few plotting increments in any one direction when the recording pen is associated with the recording medium, a substantial time-saving is still obtained by the invention for those intervals in which the pen is lifted from the paper and translated to a new plotting position.

Although an exemplary embodiment of the invention has been disclosed in detail and discussed hereinabove, it will be understood that numerous other applications of the invention are possible and that the embodiment disclosed may be subjected to various changes, modifications and substitutions without departing from the spirit of the invention.

We claim:

1. A system for providing graphical plots comprising:

shift register means for registering a data character having a plurality of binary-valued digits, a predetermined number of first digits of each character encoding the number of increments of movement and a plurality of second digits of each character encoding the direction of movement;

plotter means for incrementally recording in each of two orthogonal directions on a recording medium;

first clock means having a frequency corresponding to the digit rate of said received data character and operatively coupled to said shift register means so that said means serially registers said binary-valued digits in synchronism with the rate at which they are received;

parallel register means coupled to said shift register means for selectively storing the character registered therein;

second clock means having a frequency rate corresponding to the incremental plotting rate of said plotter means, said rate being at a substantially higher frequency rate than that of said first clock means;

mode control means responsive to said shift register and said second clock means and operatively coupled to said parallel register means for (i) loading said parallel register means when the shift register has been filled with a character and (ii) counting down to zero at a rate determined by said second clock means that portion of the parallel register storing the first digits of the character stored therein; and decoding means responsive to said parallel register means and said mode control means and operatively connected to said plotter means for decoding the direction of movement encoded by the second digits of the character stored in said parallel register means and producing an incremental recording plotter control signal corresponding to the encoded direction for each countdown of the parallel register so that said plotter is caused to incrementally translate in the direction and for the number of increments encoded by said stored character at a rate determined by said second clock means.

2. The system for providing graphical plots as defined in claim 1 wherein certain of the characters registered by said shift register include a predetermined digit pattern for encoding a single function plotter control instruction, said system comprising:

means responsive to said shift pattern in said shift register for inhibiting loading of said parallel register means therewith, and means coupling said decoding means to said shift register for decoding said character stored therein and providing an output control signal to said plotter means for performing said instruction.

3. The system for providing graphical plots as defined in claim 2 wherein:

said mode control means deletes said countdown sequence when the loading of said parallel register has been inhibited.

4. The system for providing graphical plots as defined in claim 2 wherein:

predetermined ones of the digits of the character encode the instruction that said plotter means is to become associated with the recording means, said decoding means responding to these digits when said character is stored in the shift register and providing a corresponding control signal to said plotter means.

5. The system for providing graphical plots as defined in claim 2 wherein:

predetermined ones of the digits of the character encode the instruction that said plotter means is to become disassociated with the recording means, said decoding means responding to these digits when said character is stored in the shift register and providing a corresponding control signal to said plotter means.

6. A system for providing graphical plots as defined in claim 2 wherein:

predetermined ones of the digits of the character encode the instruction that said plotter means is to be stopped, said decoding means responding to these digits when said character is stored in the shift register and providing a corresponding stop control signal to said plotter means.

7. The system for providing graphical plots as defined in claim 2 wherein:

said plotter means includes plural incremental recorders and predetermined ones of the digits of the character encode the instruction that a specific one of said plural recorders is to be enabled, said decoding means responding to these digits when said character is stored in the shift register and providing a corresponding control signal to the selected one of said recorders.

8. The system for providing graphical plots as defined in claim 2 comprising:

mode storage means for storing a selected plotting mode, predetermined ones of the digits of the character encoding the instruction that a predetermined plotting mode is to be used, said decoding means responding to these digits when said character is stored in the shift register and providing a corresponding trigger signal to said mode storage means so that said seletced plotting mode is used during subsequent data plotting.

9. The system for providing graphical plots as defined in claim 8 wherein:

a single incremental recording plotter control signal is produced for each countdown of the parallel register in one of said plotting modes.

10. A system for providing graphical plots as defined in claim 8 wherein:

plural incremental recording plotter control signals are produced for each countdown of the parallel register in one of said plotting modes.

11. A system for providing graphical plots as defined in claim 1 wherein:

said mode control means comprises a plurality of bistable elements for providing several unique mode states including:

an idle mode in which the mode control means is inactive;

a load mode following said idle mode coincident with the second clock and a filled shift register, said parallel register being enabled in the load mode unless the character stored in said shift register includes a predetermined digit pattern for encoding a single function plotter control instruction;

a first test count mode following the load mode coincident with the second clock;

a stop count mode following the first test count mode coincident with the second clock and an empty parallel register, said mode control returning to the idle mode when the shift register empties;

a countdown mode following the first test count mode coincident with the second clock and a nonempty parallel register, said parallel register being counted down by one upon occurrence of the countdown mode; and a second test count mode following the countdown mode coincident with the second clock, following which the countdown mode is reestablished if the second digit positions of said parallel register have a value greater than zero or stop count mode is initiated if the parallel register is empty.

12. The system for providing graphical plots as defined in claim 11 having:

a plotting mode wherein one of said incremental recording output control signals corresponding to the encoded direction is provided said plotter means coincident with said second test count mode.

13. The system for providing graphical plots as defined in claim 11 having:

a plotting mode wherein one of said incremental recording output control signals corresponding to the encoded direction is provided said plotter means coincident with either the countdown or second test count modes.

14. The system for providing graphical plots as defined in claim 1 wherein:

certain of the characters received by said shift register include a predetermined digit pattern for encoding a single function plotter control, said mode control means provides plural control states including a first state in which the mode control means is inactive, a second state initiated by the filling of said shift register, a third state when said single function plotter control is detected by said decoding means, and a fourth state for preventing recycling of said first, second and third states between pulses of the first clock means, said shift register including means for emptying same coincident with the first clock after said register has been filled, and said mode control means changing from said fourth to said first state when said shift register is emptied.

15. A system for providing graphical plots comprising:

a data processor means providing an output signal having a succession of characters each having a plurality of binary-valued digits, a plurality of first digits of each character encoding the number of increments of movement and a plurality of second digits of each character encoding the direction of movement;

transmission means for transmitting the output signal of said data processor means;

plotter means for incrementally recording in each of two orthogonal directions on a recording medium; and plotter control means responsively coupled to said transmission means and operatively coupled to said plotter means for controlling the incremental movements thereof, said plotter control means including:

first clock means initiated by the output signal of said data processor and having a frequency corresponding to the digit rate of said signal input, shift register means responsively coupled to said first clock means for serially receiving said binary-valued digits in synchronism with their rate of transmission, parallel register means coupled to said shift register means for storing the character registered therein, second clock means having a frequency rate corresponding to the incremental plotting rate of said plotter means, said rate being at a substantially higher frequency rate than that of said first clock means, mode control means responsive to said shift register and said second clock means and operatively coupled to said parallel register means for (i) loading said parallel register means when the shift register has been filled with a character and (ii) counting down to zero at a rate corresponding to said second clock means that portion of the parallel register storing the first digits of the character stored therein, and decoding means responsive to said parallel register means and said mode control means and operatively connected to said plotter means for decoding the direction of movement encoded by the second digits of the character stored in said parallel register means and producing an output control signal corresponding to the encoded direction for each countdown of the parallel register by the mode control means so that said plotter is caused to incrementally translate in the direction and for the number of increments encoded by said stored character at a rate determined by said second clock means.

16. A graphical data display system for efficiently operating a high speed incremental plotter from a substantially lower speed transmission medium comprising:

means coupled to said transmission medium for registering a data character having a plurality of binary-valued digits at a rate corresponding to the transmission rate of said transmission medium, a plurality of first digits of each character encoding the number of increments of movement and a plurality of second digits of each character encoding the direction of movement;

control means responsive to the digit positions of said register means storing said first digits for sequentially counting down said register means to a predetermined value at a rate corresponding to the incremental plotting rate of said high speed incremental plotter, and means responsive to said control means and the digit positions of said register means storing said second digits for producing an incremental recording plotter control signal corresponding to the encoded direction for each countdown of said register and at the high speed rate of said incremental plotter.

17. A graphical data display system for efficiently operating a high speed incremental plotter from a substantially lower speed transmission medium comprising:

storage means for storing a data character having a plurality of binary-valued digits at a rate corresponding to the transmission rate of said transmission medium, a plurality of digits of each character encoding the number of increments of movement and a plurality of digits of each character encoding the direction of movement, plotter means for incrementally recording in each of two orthogonal directions on a recording medium, and control means responsive to said storage means and operatively coupled to said plotter means for producing an incremental movement of said plotter means in the direction encoded by said digits of the stored character for each said number of increments encoded by the digits of the stored character, said control means driving said plotter means at a frequency rate substantially higher than the pass band of said transmission medium so that said incremental plotter is driven at substantially its full capability.

18. A system for providing graphical plots comprising:

a data processor means for generating plotter steps along arbitrary fixed axes for approximating a line segment between a set of predetermined end coordinates, said processor accumulating bits corresponding to plural increments of plotter movement along said fixed axes and making a single determination of the directional encoding for said accumulated bits, said processor providing an output signal having a succession of characters each having a plurality of binary-valued digits, a plurality of digits of each character encoding the direction of movement and a plurality of digits of each character encoding the number of increments of movement in said direction;

transmission means for transmitting the output signal of said data processor means;

storage means coupled to said transmission means for serially receiving the binary-valued digits of each character at a rate corresponding to the transmission rate of said transmission medium, plotter means for incrementally recording in each of two orthogonal directions on a recording medium, and control means responsive to said storage means and operatively coupled to said plotter means for producing an incremental movement of said plotter means in the direction encoded by said digits of the stored character for each said number of increments encoded by the digits of said stored character, said control means driving said plotter means at a frequency rate substantially higher than the pass band of said transmission medium so that said incremental plotter is driven at substantially its full capability.

19. A graphical data display system for efficiently operating a high speed incremental plotter from a substantially lower speed transmission medium comprising:

storage means for receiving data characters at a rate corresponding to the transmission rate of said transmission medium, said data characters including a plurality of binary-valued digits for encoding (i) one of a plurality of arbitrary directions and (ii) a predetermined number of incremental plots in the encoded direction and means responsive to said storage means for producing a series of plotter control pulses for driving said high speed plotter in one of said arbitrary directions and for the number of plots encoded by the received data character in said storage means, said plotter control pulses having a substantially higher frequency rate than the pass band of said transmission medium so that said incremental plotter is driven at substantially its full capability for plotting in said respective arbitrary directions.

20. The method of transmitting graphical display information in a compacted data format over a low speed data transmission medium and utilizing this information for graphical display purposes comprising the steps of:

producing a succession of characters each having a plurality of binary-valued digits, a plurality of first digits of each character encoding the number of increments of movement and a plurality of second digits of each character encoding the direction of movement;

transmitting said characters over said low speed transmission medium, registering each character as it is received from said low speed transmission medium so that said first digits occupy a first portion of said register and said second digits occupy a second portion of said register, reducing the digital value registered in the first portion of said register means one digit at a time until the value registered therein is reduced to zero, and producing an incremental movement between a recording means and a recording medium in the direction encoded in the second portion of said register each time the first portion of the register is reduced in value.

21. The method of making a graphical plot from serially transmitted data characters each having a plurality of binary-valued digits, a predetermined number of said digits encoding the number of increments of movement to be plotted in a given direction, comprising:

the first step of filling a serial register with the data character in sync with a first clock whose frequency corresponds to the rate at which said character is received;

the second step of filling a parallel register with the same character information stored in said serial register in time coincidence with a first output pulse of a second clock whose frequency is substantially higher than said first clock;

the third step of determining if the parallel register is filled in time coincidence with the second output pulse of said second clock;

the fourth step of modifying the count in said parallel register by a predetermined number in time coincidence with (i) the third output pulse of said second clock, and (ii) a filled parallel register;

repeating said third and fourth steps in time coincidence with subsequent output pulses of said second clock until said parallel register reaches a predetermined value; and producing an incremental movement between a recording means and a recording medium in accordance with each modification of the count of said parallel register.

22. The method of making a graphical plot from serially transmitted data characters encoding both incremental plotting and single function control information comprising:

the first step of filling a serial register with the data character in sync with a first clock whose frequency corresponds to the rate at which said character is received;

the second step of determining whether the character stored in said input serial register encodes single function or incremental plotter control information;

the third step of filling a parallel register with the same character information stored in said serial register in time coincidence with (i) a first output pulse of a second clock whose frequency is substantially higher than said first clock and (ii) storage of incremental plotting information in said serial register;

the fourth step of producing a control signal corresponding to the encoded single function in time coincidence with (i) the first output pulse of said second clock and (ii) storage of single function plotter control information in said serial register;

the fifth step of determining if the parallel register is filled in time coincidence with the second output pulse of said second clock;

the sixth step of modifying the count in said parallel register by a predetermined number in time coincidence with (i) the third output pulse of said second clock and (ii) a filled parallel register;

repeating said fifth and sixth steps in time coincidence with subsequent output pulses of said second clock until said parallel register reaches a predetermined value, producing an incremental movement between a recording means and a recording medium in accordance with each modification of the count of said parallel register; and entering an interlock mode in time coincidence with (i) the third or subsequent pulses of said second clock and (ii) an unfilled parallel register.

23. The method of making a graphical plot according to claim 22 including:

emptying said serial register in sync with said first clock after said register has been filled with character information; and entering an idle mode following said interlock mode in time coincidence with said second clock and an empty serial register.

24. The method of selectively providing incremental movement of a plotting element relative to a recording medium from a first to a second predetermined point on said recording medium while disassociated therefrom at a rate substantially higher than the speed of a given transmission medium, said incremental movements of the plotting element relative to the recording medium being along arbitrary directional axes respectively occurring at multiples of 45°, said method comprising the steps of:

transmitting data characters over said transmission medium at a frequency rate not exceeding the capability of said transmission medium, said characters having plural binary-valued digits encoding (i) no more than two of said arbitrary axes of plotter movement and (ii) a predetermined number of incremental plots in the encoded directions as are needed to translate the plotting element from said first to said second predetermined point on said recording medium; and producing from said transmitted character a series of incremental plotter control pulses having a frequency rate substantially higher than the speed of said transmission medium for driving said plotter in no more than two of said arbitrary directions and for the number of plots encoded by said transmitted data characters.

25. A graphical data display system for efficiently operating a high speed incremental plotter from a substantially lower speed transmission medium comprising:

storage means coupled to said transmission medium for receiving and storing a data character having a plurality of binary-valued digits, a plurality of first digits of each character encoding the number of increments of movement and a plurality of second digits of each character encoding the direction of movement in either or both of two orthogonal directions;

mode control means responsive to said storage means for producing a series of control pulses corresponding to the number of increments of movement encoded by the first digits of said data character stored in said storage means, said control pulses having a substantially higher frequency rate than the pass band of said transmission medium; and decoding means responsive to said storage means and said mode control means for decoding the direction of movement encoded by the second digits of said data character stored in said storage means for producing an incremental plotter control signal corresponding to the encoded direction for each control pulse.

26. A graphical data display system for efficiently operating a high speed incremental plotter from a substantially lower speed transmission medium comprising:

storage means for receiving data characters, said data characters including a plurality of binary-valued digits for encoding a predetermined number of incremental plots, plotter means for incrementally recording in each of two orthogonal directions on a recording medium, first clock means having a frequency corresponding to the digit rate of said received data character and operatively coupled to said storage means so that said means serially registers said binary-valued digits in synchronism with the rate at which they are received, second clock means having a frequency rate corresponding to the incremental plotting rate of said plotter means, said rate being at a substantially higher frequency rate than that of said first clock means, and control means responsive to said storage means and said second clock means and operatively coupled to said plotter means for producing an incremental plotter control pulse for each said number of increments encoded by the digits of said stored character, said plotter control pulses having a substantially higher frequency rate than the pass band of said transmission medium so that said incremental plotter is driven at substantially its full capability for plotting in said respective orthogonal directions.

27. A graphical data display system for efficiently operating a high speed incremental plotter from a substantially lower speed transmission medium comprising:

storage means coupled to said transmission medium for receiving and storing a data character having a plurality of binary-valued digits, said storage means receiving and storing said chaarcter at a rate corresponding to the transmission speed of said medium;

plotter means for incrementally recording on a recording medium;

clock means having a frequency rate corresponding to the incremental plotting rate of said plotter means; and control means responsive to said storage means and said clock means and operatively coupled to said plotter means for producing a plotter control pulse for each of said number of increments encoded by the digits of said stored character, said plotter control pulses having a substantially higher frequency rate than the pass band of said transmission medium so that said incremental plotter is driven at substantially its full plotting capability.

References Cited

UNITED STATES PATENTS

| | | | |
|---|---|---|---|
| 3,146,386 | 8/1964 | Gerber | 318—8 |
| 3,199,111 | 8/1965 | Jennings et al. | 346—29 |
| 3,205,344 | 9/1965 | Taylor et al. | 340—324.1 X |
| 3,293,651 | 12/1966 | Gerber et al. | 346—29 |
| 3,246,125 | 4/1966 | Mergler | 235—151.11 |
| 3,393,300 | 7/1968 | Jennings et al. | |

ROBERT C. BAILEY, *Primary Examiner.*

H. E. SPRINGBORN, *Assistant Examiner.*

U.S. Cl. X.R.

235—151